UNITED STATES PATENT OFFICE.

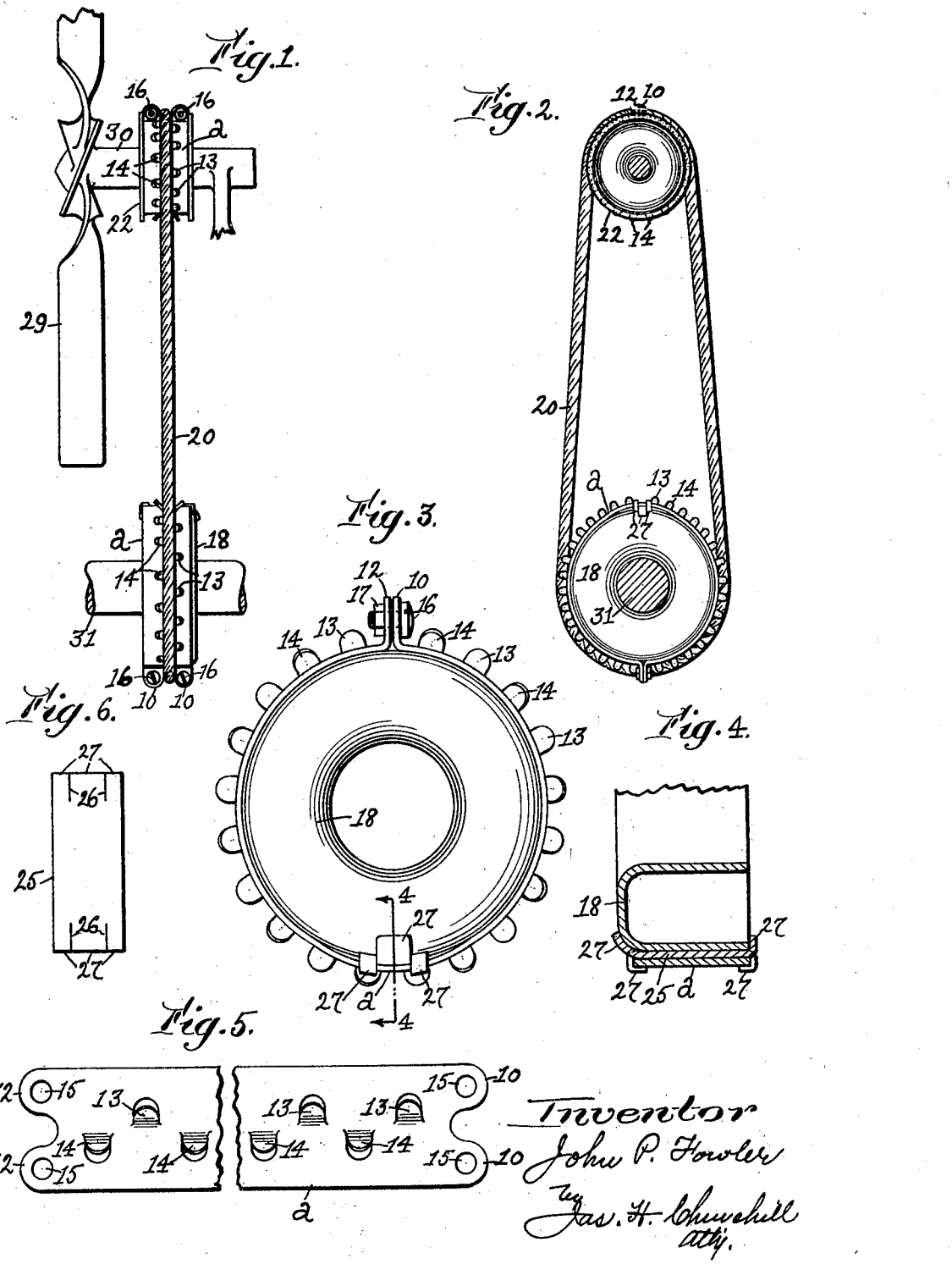

JOHN P. FOWLER, OF SOMERVILLE, MASSACHUSETTS.

PULLEY.

1,402,489.  Specification of Letters Patent.  Patented Jan. 3, 1922.

Application filed November 22, 1919. Serial No. 340,004.

*To all whom it may concern:*

Be it known that I, JOHN P. FOWLER, a citizen of the United States, residing in Somerville, in the county of Middlesex and State of Massachusetts, have invented an Improvement in Pulleys, of which the following description, in connection with the accompanying drawings, is a specification, like characters on the drawings representing like parts.

This invention relates to a pulley and more particularly to a pulley rim which is supplemental to and detachable from the main rim of a pulley and has provision for enabling the pulley to be used with any form of belt and especially round belts made from a coiled wire.

To this end the supplemental rim is made from a sheet metal strip or band, which is capable of being bent or shaped into substantially cylindrical form and is provided at its ends with lugs or ears which are connected together to form a substantially continuous annular band or rim, and which is provided between its side edges with projections for forming an annular groove for the reception of a belt whose cross section is materially smaller than the width of the said rim. Provision is also made for fastening the supplemental pulley rim to a smooth or unflanged pulley against lateral displacement thereon.

These and other features of this invention will be pointed out in the claims at the end of this specification.

Fig. 1 represents two pulleys embodying the invention connected by a coiled wire belt.

Fig. 2, a side elevation of the pulleys and belt shown in Fig. 1.

Fig. 3, a side elevation of the lower pulley shown in Fig. 1 on an enlarged scale.

Fig. 4, a detail in section on the line 4—4, Fig. 3.

Fig. 5, a plan of the blank from which the rim shown in Fig. 3 is formed, and

Fig. 6, a detail of the locking device shown in Fig. 3.

Referring to the drawing and especially Fig. 5, *a* represents a sheet metal strip or band, which is suitably manipulated to provide the same at its opposite ends with projections 10, 12, located on opposite sides of the longitudinal center of the said band or strip, and with projections 13, 14, which are struck up out of the band or strip *a* between the side edges thereof, said projections being arranged in rows on opposite sides of the longitudinal center with the projections 13 in one row preferably arranged in staggered relation to the projections 14 in the other row. The end projections 10, 12, are bent substantially at right angles to the body portion of the band or strip *a* as represented in Fig. 3, and in the present instance are provided with holes 15 for the passage of screws 16, with which co-operate nuts 17 to cause the band or strip *a* to conform closely to the periphery of the pulley 18 to which it is applied to form a detachable supplemental rim therefor. The projections 13, 14, are preferably inclined from the band or strip *a* and co-operate to form a substantially narrow annular groove for the reception of a belt 20, which may be of any suitable material and preferably round in cross section.

An inexpensive and durable belt 20 may be made from coiled wire of the proper diameter to fit the groove formed by the projections 13, 14.

The detachable rim *a* may be applied to any smooth hub or pulley and provide the same with a rim having a groove for the reception of the belt.

The detachable rim *a* may also be used with a pulley or hub having side flanges 22 as shown in Figs. 1 and 2, or it may be applied to a pulley or hub which is smooth or unflanged as represented in Figs. 1 and 2.

When used with a pulley or hub having side flanges, the rim *a* needs only to be secured to the pulley by the screws 16 and nuts 17, as the side flanges 22 serve to prevent lateral displacement of the rim *a*. When used on an unflanged pulley or hub, it is preferred to employ a device for locking the rim *a* to the pulley or hub against lateral displacement.

In the present instance, one construction of locking device is shown, which consists of a thin metal bar or piece 25 (see Fig. 6), which is provided at its opposite ends with cuts or slits 26 forming three fingers 27.

The metal bar or piece 25 is made of sufficient length to extend across the pulley or hub 18 and have the fingers 27 project sufficiently to enable the two outside fingers to be bent into engagement with the outer surface of the rim *a* and the intermediate finger to be bent in the opposite direction into engagement with the opposite sides of the pulley or hub 18 as shown in Figs. 3 and 4.

The detachable rim $a$ is capable of being applied to a pulley in a substantially short time, and is especially useful in connection with the pulleys of an automobile employed to drive the fan 29 thereof.

In Fig. 1, I have represented the pulley mounted on the fan shaft 30 as provided with a detachable rim $a$ and connected by an endless belt 20 of coiled wire with the detachable rim $a$ on the motor shaft 31.

The detachable rims and wire belt shown in Fig. 1 are capable of being used as a standard equipment, but they are of special advantage as an emergency equipment, to be used in case of accident to the regular equipment, as, for instance, if the regular belt should break when the motorist is out on the road and especially when removed from a garage, the emergency equipment can be installed by the motorist without trouble and in a minimum time, and in actual practice, it has been applied to a Ford car in about fifteen minutes.

While the improved pulley rim is especially useful in connection with the fan equipment of motor vehicles, it is not desired to limit the invention in this respect, as it is evident it can be used to advantage on various kinds of machines and in shops as an emergency or permanent equipment, and further enables a small pulley to be equipped with a larger rim so as to enable a larger belt to be used if desired or vice versa.

In the present instance, one embodiment of the invention is shown but it is not desired to limit the invention to the particular construction shown.

Claims.

1. The combination with a pulley provided with a circular unflanged rim, of a supplemental rim therefor comprising a metal band or strip encircling said unflanged rim and provided between its side edges with means for forming an annular groove for the reception of a belt, means for clamping the supplemental rim to the rim of the pulley, and means for securing the supplemental rim against lateral displacement on the unflanged rim of said pulley.

2. A supplemental rim for pulleys comprising a sheet metal band or strip provided with struck up projections located between the side edges of said band or strip and forming a groove for the reception of a belt, ears extended from the ends of said band or strip at an angle thereto, and means for connecting said ears.

3. A supplemental rim for pulleys comprising a sheet metal band or strip provided with struck up projections located between the side edges of said band or strip and forming a groove for the reception of a belt, said projections being arranged in rows extended longitudinally of said band or strip with the projections in one row in staggered relation to the projections in the other row.

In testimony whereof, I have signed my name to this specification.

JOHN P. FOWLER.